United States Patent [19]

Morishita et al.

[11] Patent Number: 4,736,810
[45] Date of Patent: Apr. 12, 1988

[54] FAIL SAFE METHOD AND SYSTEM FOR MOTOR DRIVEN POWER STEERING APPARATUS

[75] Inventors: Mitsuharu Morishita; Shinichi Kohge, both of Hyogo, Japan

[73] Assignee: Mitsubishi Denki Kabushiki Kaisha, Tokyo, Japan

[21] Appl. No.: 60,891

[22] Filed: Jun. 12, 1987

[30] Foreign Application Priority Data

Jun. 12, 1986 [JP] Japan .............................. 61-139024

[51] Int. Cl.$^4$ .............................................. B62D 5/04
[52] U.S. Cl. .................................................. 180/79.1
[58] Field of Search .............................. 180/79.1, 142; 74/388 PS

[56] References Cited

U.S. PATENT DOCUMENTS

| | | | |
|---|---|---|---|
| 3,739,738 | 6/1973 | Cavil ............................. | 180/79.1 X |
| 4,573,545 | 3/1986 | Kalns ............................. | 180/79.1 |
| 4,621,327 | 11/1986 | Dolph et al. .................. | 180/79.1 X |

*Primary Examiner*—John A. Pekar
*Attorney, Agent, or Firm*—Sughrue, Mion, Zinn, Macpeak & Seas

[57] ABSTRACT

A fail safe system for a motor driven power steering apparatus comprises a DC motor for subsidiarily energized said steering apparatus; a handle for receiving steering rotary force to produce a corresponding steering torque; a torque sensor for producing a signal corresponding to said rotary force applied to said handle, said torque sensor comprising a potentiometer having a movable electrode for detecting a torsional angle owing to said steering torque and a torque neutral region sensor arranged to operate together with said movable electrode for detecting a neutral region of said steering torque to produce a signal indicating whether said steering torque is within said torque neutral region or not; a motor current detection circuit for detecting a current flowing in said DC motor; an electromagnetic clutch for coupling/decoupling an output of said DC motor to/from said steering apparatus; a power supply circuit for supplying electric power to said DC motor and said electromagnetic clutch; and a fail safe relay provided with a normally opened contact connected in series in said power supply circuit; said fail safe relay being interrupted to remove said subsidiary steering force when a larger current exceeding said torque neutral region flows in said motor-current detection circuit while said torque neutral region sensor produces the signal indicating that said steering torque is within said torque neutral region.

3 Claims, 2 Drawing Sheets

FAIL SAFE METHOD AND SYSTEM FOR MOTOR DRIVEN POWER STEERING APPARATUS

BACKGROUND OF THE INVENTION

1. Field of the Invention

The present invention relates to a fail safe method and in a motor-driven power steering apparatus in which a steering apparatus of a car is subsidiarily energized by rotary force of an electric motor.

2. Background of The Invention

In the conventional power steering apparatus, force for turning a handle (steering torque), which is applied by a driver, has been detected by a torque sensor such that the steering torque is converted into a torsional angle displacement of a torsion bar or the like and the torsional angle of the torsion bar is converted into an electric signal by a potentiometer in the torque sensor.

In such an apparatus as described above, however, the signal of the torque sensor is received as an input to control a driving current of a motor as well as an electromagnetic clutch for subsidiarily energizing the steering apparatus through a control unit, and therefore there has been such a problem that the steering apparatus is turned right or left of itself against will of a driver to cause a danger in case of a failure in the torque sensor or the control unit so as to make it impossible to perform the control.

SUMMARY OF THE INVENTION

It is therefore an object of the present invention to solve the problem as described above in the prior art.

It is another object of the present invention is to provide a fail safe method and system in a motor-driven power steering apparatus in which no subsidiarily energizing force acts when a failure occurs in a torque sensor or a control unit.

In order to attain the above objects, according to the present invention, the fail safe system in a motordriven power steering apparatus, comprises: a torque sensor using a potentiometer for detecting a torsional angle owing to steering torque of a handle; a torque neutral region sensor arranged to operate integrally or together with a movable electrode of the potentiometer so as to detect a neutral region of the steering torque; a motor current detection circuit for detecting a current flowing in a DC motor; an electromagnetic clutch for coupling-/decoupling an output of the motor as subsidiary steering force; and a fail safe relay provided with a normally opened contact inserted in series in a power supply circuit to the motor and the electromagnetic clutch, the fail safe relay being arranged so as to be interrupted to remove the subsidiarly steering force when a larger current exceeding the torque neutral region flows in the motor-current detection circuit while the torque neutral region sensor is producing a signal indicating that the torque is within the torque neutral region.

Thus, in the fail safe system according to the present invention, when there is some trouble with the torque sensor or the control unit, then the power source for the motor and the electromagnetic clutch is interrupted by interrupting the fail safe relay to thereby realize safe steering with no subsidiarily energizing force.

BRIEF DESCRIPTION OF THE DRAWINGS

Other objects and advantages of the invention will become apparent during the following discussion of the accompanying drawings, wherein.

DETAILED DESCRIPTION OF PREFERRED EMBODIMENT

Figure 1:
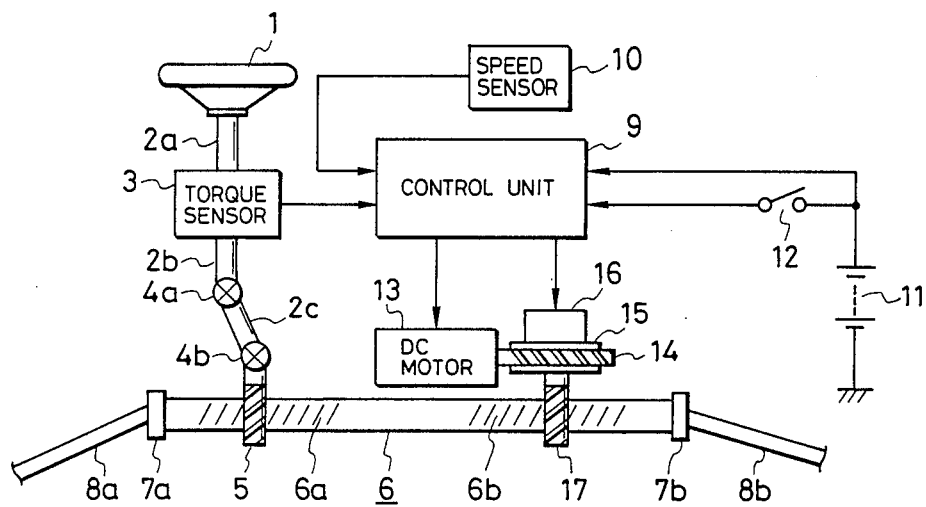
FIG. 1 is a diagram showing an arrangement of an embodiment of a motor-driven system in a power steering apparatus according to the present invention.

Referring to the drawings, an embodiment of the fail safe system in the motor-driven power steering apparatus according to the present invention will be described hereunder. In FIG. 1, the arrangement is provided with a handle 1 for receiving steering rotary force, a torque sensor 3 for producing a signal corresponding to the rotary force applied to the handle 1, a first universal joint 4a, a second universal joint 4b, a first steering shaft 2a connecting the handle 1 to the torque sensor 3, a second steering shaft 2b connecting the torque sensor 3 to the first universal joint 4a, a third steering shaft 2c connecting the first universal joint 4a to the second universal joint 4b, a first pinion shaft 5 connected to the second universal joint 4b, a first pinion shaft 5 connected to the second universal joint 4b, a rack shaft 6 constituted by a first rack tooth portion 6a engaged with the first pinion shaft 5 and a second rack tooth portion 6b, a ball joint 7a connecting a tie rod 8a to one end of the rack shaft 6, another ball joint 7b connecting another tie rod 8b to the other end of the rack shaft 6, a control unit 9, a vehicle speed sensor 10 for detecting a vehicle speed, a car-mounted battery 11, a key switch 12, a DC motor 13 provided with a shunt or a permanent magnetic field system and driven by the battery 11 through the control unit 9, a worm shaft 14 connected to an output shaft of the motor 13 so as to consitute a reduction gear, a worm wheel shaft 15 engaged with the worm shaft 14 so as to be driven by the latter, an electromagnetic clutch 16 for mechanically connecting/disconnecting the wheel shaft 15 to/from a second pinion shaft 17 engaged with the rack teeth portion 6b of the rack shaft 6 in accordance with the instruction from the control unit 9.

Figure 2:
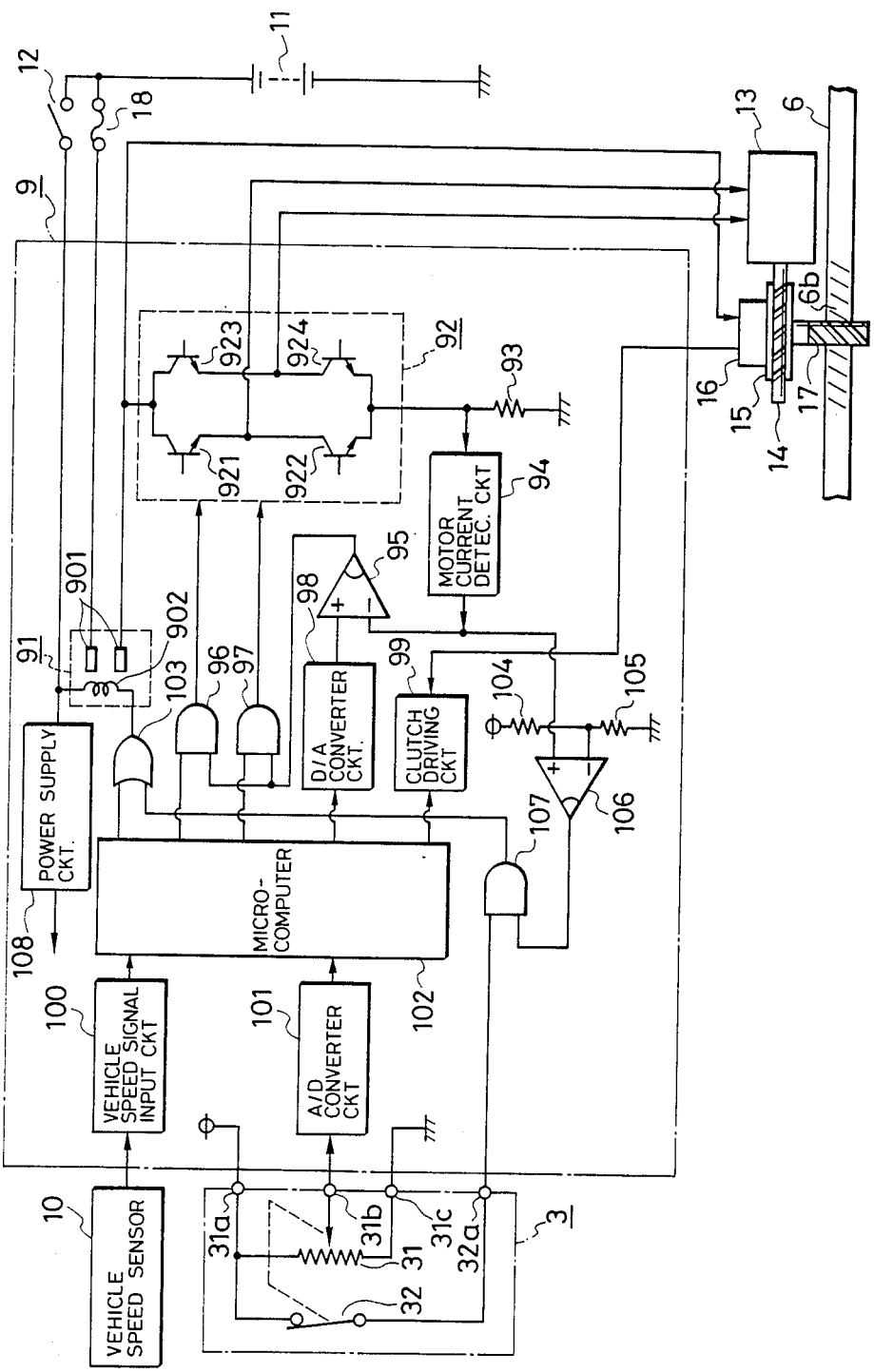
FIG. 2 is a circuit diagram of a steering torque sensor and a control unit according to the present invention.

FIG. 2 is a diagram showing an arrangement of the steering torque sensor 3 and the control unit 9. In the torque sensor 3, a potentiometer 31 is arranged to convert a torsional angle of a not-shown torsion bar twisted by the steering of the handle 1 into an electric signal. The potentiometer 31 has a positive polarity power supply terminal 31a, a torque signal output terminal 31b, and a negative polarity power supply terminal 31c. A neutral region sensor 32 is arranged to operate integrally or together with a movable member of the potentiometer 31 to produce a signal of "H" at a neutral signal output terminal 32a within a neutral region (right and left extremities of 0.2–0.3 Kg.m).

In the control unit 9, a fail safe relay 91 is constituted by a driving coil 902 connected at one end thereof to a battery 11 through the key switch 12 and a pair of normally opened contacts 901 connected at one side thereof to the battery 11 through a fuse 18. A power transistor unit 92 is constituted by four power transistors 921 through 924 and arranged to be energized by the battery 11 through the fuse 18 and the normally opened contact 901 of the fail safe relay 91 so as to perform interruption and polarity switching of the motor 13. A shunt resistor 93 is provided between the transistor unit 92 and the earth so as to detect an electric current flowing in the motor 13. A motor current detection circuit 94 is connected to the shunt resistor 93 so as to amplify a voltage drop across the shunt resistor 93 due to a motor current flowing therethrough. A vehicle speed signal input circuit 100 is connected to the vehicle speed sensor 10 so as to serve as a vehicle speed signal input interface circuit of the latter. An A/D converter circuit 101 is connected to the torque signal output terminal 31b so as to convert an analog steering torque signal of the potentiometer 31 in the torque sensor 3 into a digital signal. A microcomputer 102 is connected to the input circuit 100 and the A/D converter circuit 101 so as to receive the vehicle speed signal and the digital steering torque signal. A two-input OR circuit 103 is connected at one input thereof to the microcomputer 102 so as to receive a fail safe signal output produced from the computer 102 and connected at an output thereof to the other end of the driving coil 902 in the fail safe relay 91. A first two-input AND circuit 96 is connected at one input thereof to the microcomputer 102 so as to receive a motor rightward-driving signal from the microcomputer 102 and connected at an output thereof to the transistor unit 92 so as to produce a signal for driving the rightward-driving transistors 921 and 924 in the transistor unit 92. A second two-input AND circuit 97 is connected at one input thereof to the microcomputer 102 so as to receive a motor leftward-driving signal from the microcomputer 102 and connected at an output thereof to the transistor unit 92 so as to produce a signal for driving the leftward-driving transistors 921 and 924 of the transistor unit 92. A D/A converter circuit 98 is connected to the microcomputer 102 so as to convert a digital motor driving signal produced by the latter into an analog signal. An electromagnetic clutch criving circuit 99 is connected between the microcomputer 102 and the electromagnetic clutch 16 so as to drive the clutch 16 in accordance with an electromagnetic clutch driving signal produced by the microcomputer 102. A first comparator 95 is connected at its positive and negative inputs to the respective outputs of the D/A converter circuit 98 and the motor current detection circuit 94 respectively, and connected at its output to the respective other input terminals of the first and second AND circuits 96 and 97. Resistors 104 and 105 are connected in series to each other so as to constitute a voltage divider for producing a reference voltage. A second comparator 106 is connected at its positive and negative input terminals to the output of the motor current detection circuit 94 and the junction between the voltage dividing resistors 104 and 105, respectively. A third two-input AND circuit 107 is connected at its two inputs to the respective outputs of the comparator 106 and the torque neutral region sensor 32 in the torque sensor 3, and is connected at its output to the other input of the OR circuit 103. A constant voltage power supply circuit 108 is connected to the battery 11 through the key switch 12 so as to supply a constant voltage to the constituent blocks in the control unit 9.

Figure 3:
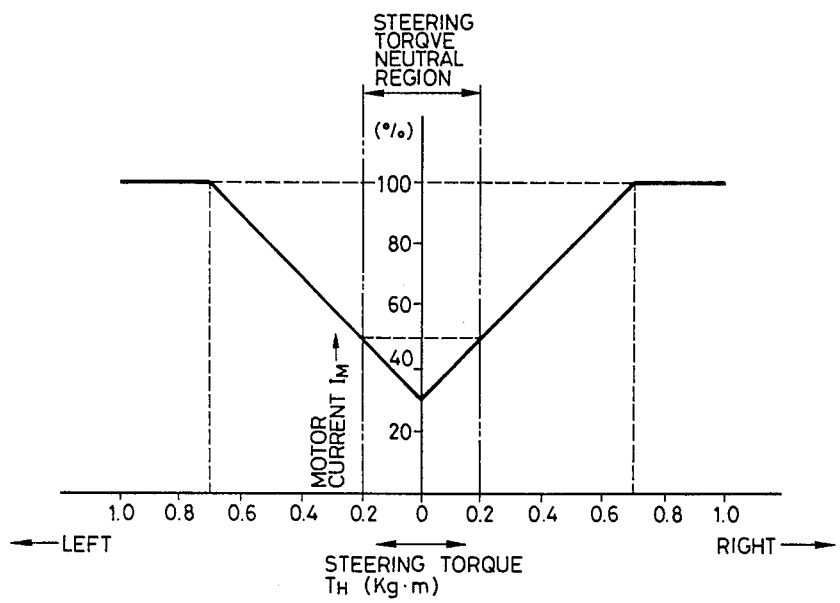
FIG. 3 is a characteristic diagram of the steering torque.

Subsequently, the operation of the above-described apparatus will be described. First, in FIGS. 1 and 2, when the key switch 12 is turned on to start the engine, power is supplied from the battery 11 to the power supply circuit 108 so that all the constituent blocks in the control unit 9 are made to start to operate. At that time, the power is also supplied from the control unit 9 to the steering torque sensor 3, so that an analog steering torque signal is produced from the potentiometer 31, and a signal indicating whether the steering torque is in the neutral region or not is produced from the torque neutral region sensor 32. The analog vehicle speed signal produced from the vehicle speed sensor 10 is taken into the microcomputer 102 through the vehicle speed signal input circuit 100 constituting the input interface circuit. The analog steering torque signal of the potentiometer 31 is also taken into the microcomputer 102 after A/D converted through the A/D converter circuit 101 constituting an input interface circuit. As a result of the operation, a fail safe relay enable signal of "L" is produced by the microcomputer 102 and applied to the OR circuit 103 when the torque sensor 3 and the vehicle speed sensor 10 are judged to be normal. On the other hand, in the case where the torque neutral region sensor 32 detects the fact that the steering torque is in the neutral region, the torque neutral region sensor 32 produces a signal of "H". Unless the motor current flowing in the motor 13 exceeds a value (50%) corresponding to the extremities of the steering torque neutral region as shown in FIG. 3, the second comparator 106 produces a signal of "L" because the voltage applied to the positive input terminal of the second comparator 106 is lower than the reference voltage applied at the negative input terminal thereof. Accordingly, the third AND circuit 107 produces a signal of "L". Being "L" at both the two inputs, the OR circuit 103 becomes "L" at its output, and the driving coil 902 in the fail safe relay 91 is energized to thereby close the normally opened contacts 901 therein, so that the power is supplied from the battery 11 to the power transistor unit 92 through the fuse 18 and the normally opened contacts 901. At the same time, since an ON-command is applied to the electromagnetic clutch driving circuit 99 from the microcomputer 102, a current is made to flow from the battery 11 to the electromagnetic clutch 16 through the fuse 18, the normally opened contacts 901 which is now closed, the electromagnetic clutch 16, and the clutch driving circuit 99, so that the electromagnetic clutch 16 is actuated to mechanically connect the worm wheel shaft 15 to the second pinion shaft 17.

Under the conditions as described above, however, if the handle 1 is in a state of being not steered by a driver, the steering torque sensor 3 is producing no signal indicating steering torque (indicating the fact that the steering torque is one-sided neither right nor left but in the neutral position), so that as the result of operation, the microcomputer 102 instructs both the first and second AND circuits 96 and 97 so as not to perform motor driving and instructs the motor current D/A converter circuit 98 to make the motor current zero. Accordingly, the power transistor unit 92 is made to be in a state so as not to flow a current in the motor 13, so that the handle 1 is made to be in a state of being not subsidiarily energized. Next, when the handle 1 is steered right (or left) in this state, the steering torque is transmitted to the steering torque sensor 3 through the steering shaft 2a and the potentiometer 31 in the sensor 3 produces an analog steering torque signal in proportion to the steering torque in the right (or left) direction. When the steering torque becomes beyond the torque neutral region (right and left extremities of 0.2–0.3 Kg.m), the torque neutral region sensor 32 produces a signal of "L"

and at the same time the steering torque is transmitted to the first rack tooth portion 6a of the rack shaft 6 through the steering shaft 2b, the universal joint 4b, the steering shaft 2c, the universal joint 4b, and the pinion shaft 5, so that the rotary movement is converted into a linear one. On the other hand, the analog steering torque output signal produced from the potentiometer 31 in the torque sensor 3 is applied in the form of a digital signal to the microcomputer 102 through the steering torque A/D converter circuit 101, and the output of "L" produced from the torque neutral region sensor 32 is applied to the AND circuit 107. A vehicle speed pulse signal produced from the vehicle speed sensor 10 is applied to the microcomputer 102 through the vehicle speed signal input circuit 100. The microcomputer 102 operates to produce a motor rightward driving signal of "H" which is applied to the first AND circuit 96 (or a motor leftward driving signal of "H" to be applied to the second AND circuit 97), and at the same time produces the digital signal indicating a motor current command value to the motor current D/A converter circuit 98 which in turn converts the motor current command value into an analog output signal. The analog output signal is supplied to the positive input terminal of the comparator 95. At that time, no current flows in the motor 13 and the shunt resistor 93 has no voltage drop across the same, so that the output of the motor current detection circuit 94 becomes zero to thereby make the output of the comparator 95 "H". Receiving the rightward (or leftward) driving command signal of "H" from the computer 102 and the output of "H" of the comparator 95, the first AND circuit 96 (or the second AND circuit 97) produces an output signal of "H" to the power transistor unit 92 so as to turn on the power transistor elements 921 and 924 (or the power transistor elements 923 and 922) so as to cause the motor 13 to rotate right (or left). Thus, a motor current flows in the motor 13 from the battery 11 through a circuit formed of the fuse 18, the normally opened contact 901 which is now in the closed state, the power transistor element 921 (or the power transistor element 923), the motor 13, the power transistor element 924 (or the power transistor element 922), and the shunt resistor 93. The motor current generates a potential difference across the shunt resistor 93, the potential difference being amplified by the motor current detection circuit 94 and fed back to the negative input terminal of the comparator 95. If the fed-back voltage exceeds the output voltage produced from the motor current D/A converter circuit 98, the output of the comparator 95 becomes "L", so that the first AND circuit 96 (or the second AND circuit 97) produces an output signal of "L" to thereby turn off either one of the power transistor element 924 (or the power transistor element 922) and the power transistor element 921 (or the power transistor element 923). By the repetition of the operation described above, the current flowing in the motor 13 is controlled to the current command issued by the computer 102. In accordance with the thus controlled motor current, the motor 13 substantially proportionally generates torque with less influence of the rotational speed thereof. The torque generated by the motor 13 is subject to speed reduction by the worm shaft 14 and the worm wheel shaft 15, transmitted to the pinion shaft 17 through the electromagnetic clutch 16, and then transmitted to the second rack tooth portion 6b of the rack shaft 6 so that the torque due to a rotary movement is converted into a thrust due to a linear movement. The thrust is set to be coincident in vector direction with the thrust obtained by converting the steering torque applied to the handle 1 into a linear movement, so that the handle 1 is subsidiarily energized to operate in the direction to reduce the torque applied to the torque sensor 3 to thereby reduce the steering torque signal of the potentiometer 31 in the torque sensor 3 and reduce the steering torque.

Although normally operating in such a manner as described above, the system may operates in a case of failure as follows. That is, for example, assume that a failure occurs in the circuit from the potentiometer 31 in the torque sensor 3 to the power transistor unit 92 in the control unit 9 so that a large current is made flow in the motor 13 in spite of application of no steering torque to the handle 1 by the driver. In this case, in spite of the torque neutral region signal of "H" produced by the neutral region sensor 32 in the torque sensor 3, the motor current becomes large to increase the output of the motor current detection circuit 94 so that the output of the second comparator 106 becomes "H" because the potential at its positive input terminal exceeds the reference voltage at its negative input terminal. Accordingly, the output of the third AND circuit 107 becomes "H" and the output of the OR circuit 103 becomes "H", so that the driving coil 902 in the fail safe relay 91 is deenergized to open the normally opened contacts 901 to thereby interrupt the motor 13 as well as the electromagnetic clutch 16 to separate the worm wheel shaft 15 from the pinion shaft 17. Thus, the handle 1 comes in a state where it is not subject to subsidiary energization so that steering is performed with no power assist.

Although the embodiment has been described as to the system provided with the pinion 17 used for the power assist, the present invention is not limited to this but applicable with the same effect to the case where an arrangement is made so that power-assist is applied directly to the first pinion 5. Although the embodiment has been described as to be case where the microcomputer 102 is used in the control unit 9, the same operation can be obtained in the case of using an analog circuit, or in the case of using a MOS FED unit in place of the power transistor unit 92.

As described above, according to the present invention, in a steering torque sensor, a torque neutral region sensor for detecting a torque neutral region is provided separately from a potentiometer for detecting an analog value of steering torque, and arranged to be moved integrally or together with the movable portion of the potentiometer, so that in the case where a current exceeding the torque neutral region flows in the motor under the condition the torque neutral region sensor is producing a neutral region signal, the fail safe relay is interrupted so that the steering is performed with no subsidiary energization to thereby improve the safety.

What is claimed is:
1. A fail safe method for a motor driven power steering apparatus, comprising the steps of:
 turning on a key switch for supplying electric power from a battery to a control unit and a steering torque sensor;
 detecting a steering torque corresponding to a rotary force applied to a handle by a potentiometer of said steering torque sensor, and detecting by a torque neutral region sensor of said steering torque sensor whether or not said steering torque is within a neutral region;

supplying electric power from a battery to a DC motor for supplying a subsidiary steering force to said steering apparatus in response to signals generated from said potentiometer and said torque neutral region sensor;

detecting a current flowing in a DC motor by a motor current detection means; and interrupting a fail safe relay provided with a normally opened contact connected between said battery and said DC motor to thereby remove said subsidiary steering force, if a larger current exceeding said torque neutral region flows in said DC motor current detection means while said torque neutral region sensor detects that said steering torque is within a neutral region.

2. A fail safe method as claimed in claim 1, wherein said torque neutral region sensor operates together with a movable electrode of said potentiometer.

3. A fail safe system for a motor driven power steering apparatus, comprising:

a handle receiving steering rotary force to procude a corresponding steering torque;

a torque sensor for producing a signal corresponding to said rotary force applied to said handle, said torque sensor comprising a potentiometer having a movable electrode for detecting a torsional angle owing to said steering torque and a torque neutral region sensor arranged to operate together with said movable electrode for detecting a neutral region of said steering torque to produce a signal indicating whether said steering torque is within said torque neutral region or not;

a motor current detection circuit for detecting a current flowing in said DC motor;

an electromagnetic clutch for coupling/decoupling an output of said DC motor to/from said steering apparatus;

a power supply circuit for supplying electric power to said DC motor and said electromagnetic clutch; and a fail safe relay provided with a normally opened contact connected in series in said power supply circuit, said fail safe relay being interrupted to remove said subsidiary steering force when a larger current exceeding said torque neutral region flows in said motor-current detection circuit while said torque neutral region sensor produces the signal indicating that said steering torque is within said torque neutral region.

* * * * *